(12) United States Patent
Padula, II et al.

(10) Patent No.: US 10,449,804 B1
(45) Date of Patent: Oct. 22, 2019

(54) SUPERELASTIC TIRE

(71) Applicant: The United States of America as represented by the Administrator of NASA, Washington, DC (US)

(72) Inventors: Santo A. Padula, II, Valley City, OH (US); James Benzing, Cleveland, OH (US); Vivake M. Asnani, North Olmsted, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/370,322

(22) Filed: Dec. 6, 2016

Related U.S. Application Data (60) Provisional application No. 62/266,183, filed on Dec. 11, 2015.

(51) Int. Cl.
| | |
|---|---|
| *B60C 7/20* | (2006.01) |
| *B60C 7/06* | (2006.01) |
| *C22F 1/00* | (2006.01) |
| *C22C 19/03* | (2006.01) |
| *C22C 20/00* | (2006.01) |
| *C22C 5/02* | (2006.01) |
| *C22C 30/02* | (2006.01) |
| *C22C 13/00* | (2006.01) |
| *C22C 18/02* | (2006.01) |
| *C22C 5/04* | (2006.01) |
| *C22C 9/05* | (2006.01) |
| *C22C 30/00* | (2006.01) |
| *C22C 27/02* | (2006.01) |

(52) U.S. Cl.
CPC .............. *B60C 7/20* (2013.01); *B60C 7/06* (2013.01); *B60Y 2200/80* (2013.01); *C22C 5/02* (2013.01); *C22C 5/04* (2013.01); *C22C 9/05* (2013.01); *C22C 13/00* (2013.01); *C22C 18/02* (2013.01); *C22C 19/03* (2013.01); *C22C 20/00* (2013.01); *C22C 27/02* (2013.01); *C22C 30/00* (2013.01); *C22C 30/02* (2013.01); *C22F 1/006* (2013.01)

(58) Field of Classification Search
CPC .... B60C 7/20; B60C 7/06; C22C 5/02; C22C 5/04; C22C 18/02; C22C 13/00; C22C 27/02; C22C 30/02; C22C 30/00; B60Y 2200/80
USPC ................ 152/14, 17, 25, 32, 33, 87, 88, 97
See application file for complete search history.

(56) References Cited

U.S. PATENT DOCUMENTS

| | | | |
|---|---|---|---|
| 6,554,039 B1* | 4/2003 | Riva ..................... | B60C 15/028 148/402 |
| 8,931,531 B2* | 1/2015 | Kubeck .................... | B60C 7/20 152/250 |
| 2010/0034057 A1* | 2/2010 | Levingston .......... | G04B 17/222 368/175 |

(Continued)

*Primary Examiner* — S. Joseph Morano
*Assistant Examiner* — Jean W Charleston
(74) *Attorney, Agent, or Firm* — Robert H. Earp, III; Williamson M. Johnson (57) ABSTRACT

A tire includes a plurality of SMA springs. Each SMA spring includes a first end portion, a second end portion, and an arching middle portion. Each SMA spring is interlaced with at least one other SMA spring thereby forming a laced toroidal structure extending about an entire circumference of the tire.

20 Claims, 6 Drawing Sheets

(56) References Cited

U.S. PATENT DOCUMENTS

2011/0024010 A1\* 2/2011 Browne ................ B60C 11/00
152/209.5

\* cited by examiner

SUPERELASTIC TIRE

CROSS REFERENCE TO RELATED APPLICATIONS

This application claims the benefit of U.S. Provisional Patent application, Ser. No. 62/266,183, entitled "Superelastic Tire" and filed Dec. 11, 2015. The entirety of the above-noted application is incorporated by reference herein.

ORIGIN OF THE INVENTION

The invention described herein was made by employees of the United States Government and may be manufactured and used by or for the Government for Government purposes without the payment of any royalties thereon or therefore.

FIELD OF THE INVENTION

The present innovation is in the field of superelastic materials. The present innovation also relates to a tire.

BACKGROUND

Surface vehicles are being developed to support long-range lunar or planetary exploration and the development of a lunar or planetary outpost. The surface vehicles will be heavier and will travel greater distances than the original Lunar Roving Vehicle (LRV) developed for the Apollo program in the late 1960s. New forms of tires are being developed to support much heavier weight loads. The tires are being developed to operate over many hundred times the travel distance as compared to those used on the Apollo LRV. Tires that have operational characteristics similar to passenger vehicles used on earth would benefit lunar and planetary surface missions and the like.

However, conventional rubber pneumatic tires cannot function acceptably on such surfaces and Space conditions. For example, rubber properties vary significantly between the cold temperatures experienced in shadow (down to 40 K) and the hot temperatures in sunlight (up to 400 K). Further, rubber degrades when exposed to direct solar radiation, without atmospheric protection. Finally, an air-filled tire is not permissible for manned lunar vehicles because of the possibility of deflation, e.g., a flat tire. To overcome these limitations, a tire design was developed for the Apollo LRV and was successfully used on Apollo missions 15, 16, and 17. This tire was woven from music wire, which was robust to lunar temperature variations and solar radiation, operated in vacuum, and did not require air for load support. This structure further functioned to contour to the lunar terrain, which facilitated traction and reduced vibration transfer to the Apollo LRV. However, because of increased weight and distance requirements for lunar vehicles, a tire with greater strength and durability is desirable.

The original wire mesh design of the Apollo LRV tire was not readily scalable. Specifically, the increase in wire diameter to create a tire that supported many times the load of the original design created two significant limitations: 1) the ability to contour to the terrain was lost, thus limiting traction and ability to isolate vibration; and 2) the increased wire stress limited functional life.

Limitations in the scalability of the original wire mesh constructions required alternate structural forms to be considered. Non-pneumatic tires based on helical spring geometries, i.e. a spring tire, lent additional design flexibility and control over performance requirements such as higher load carrying capability and improvements in traction (in particular, in soft soil) and obstacle envelopment performance.

However, designs based on helical spring constructions using conventional metals (e.g. Aluminum, Brass, Steel, and the like) can be limited when applied. The constructions exhibited a limited range over which they could be designed to function without undergoing permanent deformation during operation. This limitation occurred as a result of the helical geometries with conventional metals. As the load carrying capability of the tire is increased using the helical construction with conventional metals, a corresponding decrease in obstacle envelopment capability without damage (e.g. reversible deformation) is observed.

The aforementioned limitations with the helical based architectures result primarily from the use of conventional metals within the design. The conventional metals (e.g. aluminum, brass, steel, and the like) are what are commonly referred to as elastic-plastic materials. These materials can elastically deform (bond stretching that allows for reversible deformation) to about 0.3% strain in a material element point before an irreversible deformation mode, commonly referred to as plasticity, is initiated in the conventional metal. As a result of the limited amount of strain that the material can take prior to irreversibly deforming, structures such as helical springs (or other geometries that comprise deformations where a significant portion of the motion is not related to strain of the material) can be used in applications, in order to limit the amount of strain being imposed on the material during the deformation event.

Although, the utilization of structures like the spring will aid in allowing more deformation before the onset of plasticity, the utilization of the spring form with conventional metals can cause lower load carrying capabilities due to an increase in compliance. The helical structures with conventional metals results in tradeoffs due to the limitations of the conventional metal being used. Spring geometries designed with a specific pitch, wire diameter, and/or coil diameter for limiting and/or avoiding permanent deformation using conventional metals leads to more material being used. The additional material can result in an increase in metal volume of almost 500% in certain cases and leads to an increase in the overall mass of the tire, increased production cost, and a reduction in performance. A spring tire in accordance with the present invention overcomes these limitations, making the tire an innovative technological advance for Moon, Earth, and other planetary surfaces.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

This innovation utilizes shape memory alloys (SMAs) to increase the amount of deformation that spring tires can undergo without incurring plastic deformation. This is accomplished by utilizing the shape memory alloys to form supporting springs. A superelastic shape memory alloy (e.g. NiTi) can be subjected to strains on the order of 4-10%, all of which is recoverable, e.g. devoid of plastic deformation. A spring tire made from shape memory alloys can be virtually impervious to plastic deformation. In addition, the utilization of shape memory alloys provides enhanced control over the effective stiffness as a function of the deformation. This provides increased design versatility.

In one aspect of the subject innovation, a tire comprises a plurality of SMA springs. Each SMA spring comprises a first end portion, a second end portion, and an arching middle portion. Each SMA spring is interlaced with at least one other SMA spring thereby forming a laced toroidal structure extending about an entire circumference of the tire.

In another aspect of the subject innovation, a tire comprises a plurality of shape memory alloy (SMA) springs. Each SMA spring comprising a first end portion, a second end portion, and an arching middle portion interconnecting the first end portion and the second end portion. Each SMA spring extends radially outward from the first end portion to the middle portion and radially inward from the middle portion to the second end portion. Each SMA spring is interlaced with an adjacent SMA spring on a first side of the SMA spring and further being interlaced with an adjacent SMA spring on a second opposite side of the SMA spring thereby forming a toroidal structure extending about an entire circumference of the tire.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various embodiments of the disclosure. In some examples one element may be designed as multiple elements or multiple elements may be designed as one element.

DETAILED DESCRIPTION

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, and other embodiments associated with spring tires with superelastic shape memory alloys.

Shape memory alloys (SMAs) are a class of materials that are not limited to elastic deformation in the design. SMAs undergo a solid-state phase transformation (an inelastic process that happens to be reversible) that allows the SMA to receive up to 8-12% strain before initiating irrecoverable, plastic deformation. The increased strain capability of the SMA material translates to an increase in reversible deformation of the tire that approaches more than 40 times the deformation that can be achieved compared to a spring tire designed with conventional metals. SMA materials can enable geometries that embody a structure with higher load carrying capacity per unit of mass (i.e. greater coil pitch, smaller coil diameter, and/or greater wire diameter). These spring geometries increase the carrying load capacity and reduce the amount of material required to make the spring. Additionally, SMA materials can reduce structural mass though reduced spring material density. For example the density of a common SMA, NiTi, is ⅔ the density of steel, a conventional material. Spring tires with SMAs are capable of carrying heavier loads at a lower overall weight without undergoing permanent deformation due to their increased strain capability. In one embodiment, the SMA spring tire can be made to soften with increased deflection, thereby reducing the amount of force transferred to the vehicle during high deformation impact events. This type of softening tire increases travel speeds of both off-road and off-planet surface vehicles. A large allowable deformation of the tires provides further weight savings by eliminating the need for an inner frame, e.g. a "bump stop," from a tire/wheel assembly.

In some embodiments, a system can be envisioned by employing a coil-touching-coil spring geometry. In other embodiments, a high-pitch coil SMA spring can be employed. The nature of a high-pitch coil SMA spring can be extended to form a substantially straight wire geometry. The straight wire geometry provides significantly less SMA material. SMAs can provide a general reduction in weight for the tire that is on the order of 60-80% lighter when compared to tires constructed using conventional metals. For example, a conventional material such as tensile steel has a material density that is 1.5 times that of the most common SMA, nickel titanium (NiTi).

SMAs can operate in different phases. SMAs can operate in a martensite phase or an austenite phase, and may be able to switch between the modes. The modes can be dictated by the specific alloy composition of the SMA. If the alloy composition causes a martensite phase to be stable under the normal ambient conditions for the application (e.g. pressure, temperature, atmospheric conditions, and/or the like), then the SMA behaves as a Shape Memory Effect (SME) device. In some embodiments, a SMA design for SME can be used for tire technologies. In such cases, the SMA (in the ambient condition) has a martensitic crystal structure for SME. During an application of externally applied loads, the material goes through a process known as de-twinning, in which martensite plates of the SMA reorient in order to minimize internal strain energy. The process of reorientation is dependent on the nature of the externally applied load, the thermomechanical condition of the starting SMA, and other constraints imposed on the component. Nevertheless, the application of load will cause a reorientation to occur in order to accommodate the deformation. Upon, unloading, very little of the imposed deformation is recovered. Upon application of thermal energy, the reoriented martensite phase transforms to the parent austenite phase. The austenite phase has a memory relationship with the original macroscopic shape in which all or substantially all of the deformation is reversed.

In other embodiments, pseudoelasticity/superelasticity designed SMA tires have the ability to carry much higher loads and exhibit a more mechanically reversible design construct. The SMA material can be alloyed such that the normal ambient condition causes the austenite phase to be the stable state of the SMA, then the SMA material acts as a pseudoelastic or superelastic material. In such cases, application of externally applied loads causes the material to metastably transform to the martensite phase where the material can take advantage of 192 single variants of the martensite (e.g. 192 orientations of the twinned crystal lattice) to accommodate the deformation. This transformation, however, is only metastable and removal of the loads/stresses causes immediate reversion to the parent austenite and therefore original shape of the component. Although this process is accompanied by heat evolution, only mechanical work energy is at play in creating the transformation in this case.

A number of material systems can be used to form a tire. The following is a list of the materials producing a SME and/or superelasticity. The list of materials includes: NiTi, NiTiX (where X is a ternary alloying addition such as Hf, Zr, Au, Ag, Pt, Pd, Fe, etc.), NiTiXY (where X and Y are ternary and quaternary alloying additions similar to above), Ag—Cd, Au—Cd, Cu—Al—Ni, Cu—Sn, Cu—Zn, Cu—Zn—X (where X is a ternary alloying addition such as Si, Al, Sn, etc.), Fe—Pt, Mn—Cu, Fe—Mn—Si, Co—Ni—Al, Co—Ni—Ga, Ni—Fe—Ga, or Ti—Nb. Certain f-Ti alloys that produce significant amounts of reversible strain could be used in place of the common SMA materials.

The tire may include an interlaced plurality of SMA springs (i.e., wires which deform elastically under load with little energy loss). The tire can define a toroidal shaped structure for mounting to a wheel. The tire may contour to a surface on which the tire engages to facilitate traction while mitigating vibration transmission to a corresponding vehicle. The SMA springs support and/or distribute a load of the vehicle. The tire may be pneumatic or non-pneumatic.

Under the weight of the vehicle, the tire may be driven, towed, or provide steering to the vehicle. The SMA springs of the tire may passively contour to any terrain by flexing and moving with respect to each other. The interlaced structure of the SMA springs provides stability to the tire and prevents the structure from collapsing as the tire rotates and engages varying terrain.

The SMA springs of the tire may be resilient through a range of deformation, and thus a relatively rigid auxiliary frame may be used to prevent excessive deformation. Radially oriented springs may be used to connect the tire to the wheel. These springs may be interlaced. Other springs and/or supporting structures may be incorporated with the tire at any bias angle, from radial to circumferential, with the purpose of distributing load. These other springs may be SMA springs. Further, as one example, these other springs may extend circumferentially around the tire at a radially outer portion of the tire.

External covering of some kind (i.e., a tread) may be added to protect the SMA springs from impact damage and/or to change the tire's ability to float and generate traction.

As one example, four basic steps may be utilized to manufacture one example tire: i) interlacing SMA springs together to form a rectangular sheet with a length corresponding to the desired tire circumference; ii) interlacing ends of the rectangular sheet of springs to form a mesh cylinder; iii) attaching each end of the mesh cylinder to a "bead," the "bead" is a wire or cable ring that holds the springs at the diameter of the rim; iv) bringing the two beads together axially to cause the center to expand radially into a toroidal shape. The beads are then clamped to the wheel rim.

A tire in accordance with the present invention may be utilized on Earth, the Moon, Mars, and/or any other planetary body, since its elements operate reliably in atmospheric and terrain conditions of these planets. The tire may be utilized on its own, or incorporated as a partial or auxiliary load support/distribution system within another tire type. The tire, however, requires no air, requires no rubber, operates in difficult environments, and contours to a wide variety of terrains.

The SMA tire provides an improvement over the conventional spring tire designed to replace the Apollo LRV. The tire provides higher load capacity, since wire size of the SMA springs may be increased with relatively little functional alteration. The tire provides a longer cycle life, since wire stresses of the SMA springs are generally lower. Further, the tire provides relatively low weight per unit of vehicle load supported, since the interlaced SMA spring network is lighter than conventional spring designs when considering tires of equivalent nominal deformation. Additionally, the tire provides improved manufacturability over a mesh tire, since the SMA springs may be screwed into one another, rather than woven together. Furthermore, SMA springs are able to compress and elongate to accommodate manufacturing variations. Finally, the tire provides improved design versatility, since load distribution springs may be added to vary the tire strength in different tire locations and directions.

The tire can provide relatively low energy loss compared to tires that use frictional materials in the carcass, since the SMA springs consume significantly less energy during deformation (e.g. they can have significantly higher coefficients of restitution (CORs) when compared to conventional metals such as steels, aluminums, brasses, etc.). A tire in accordance with the present invention may thus be utilized where: low vehicle energy consumption is desired, tire failure poses a critical threat, traveling through rough terrain, the vehicle is exposed to extreme temperatures or high levels of radiation, and/or the vehicle is exposed to gun fire or bomb blasts.

Figure 1:
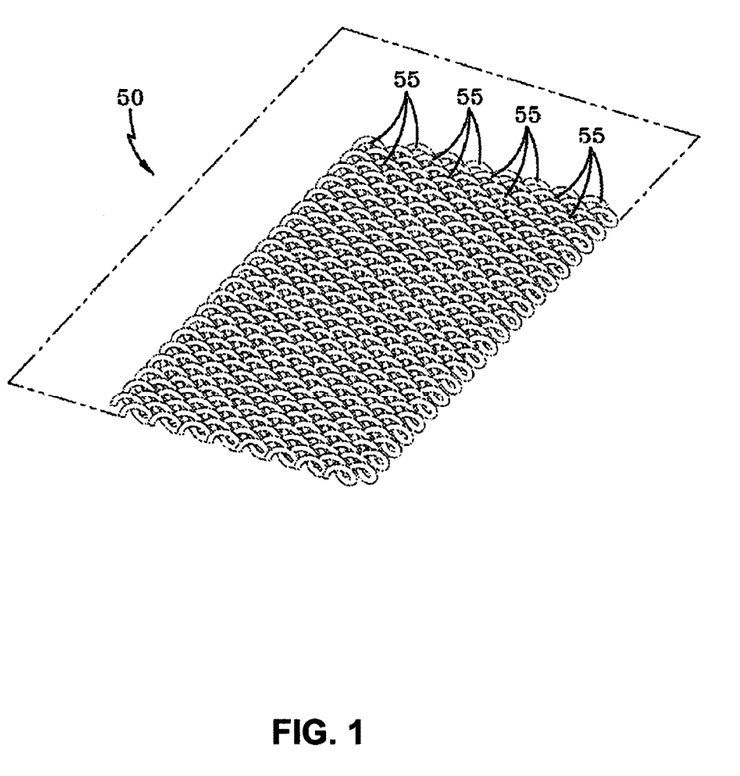
FIG. 1 represents a sheet of interlaced SMA springs for use with the present invention.
Figure 2:
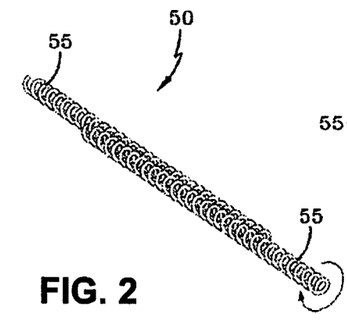
FIG. 2 represents an intermediate step in forming the sheet of FIG. 1.
Figure 3:
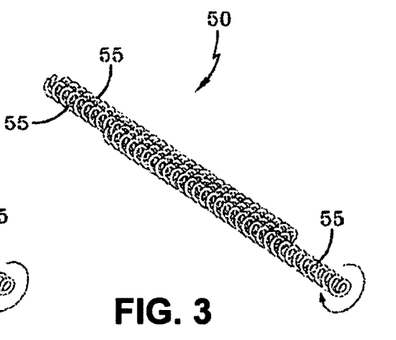
FIG. 3 represents another intermediate step in forming the sheet of FIG. 1.
Figure 4:
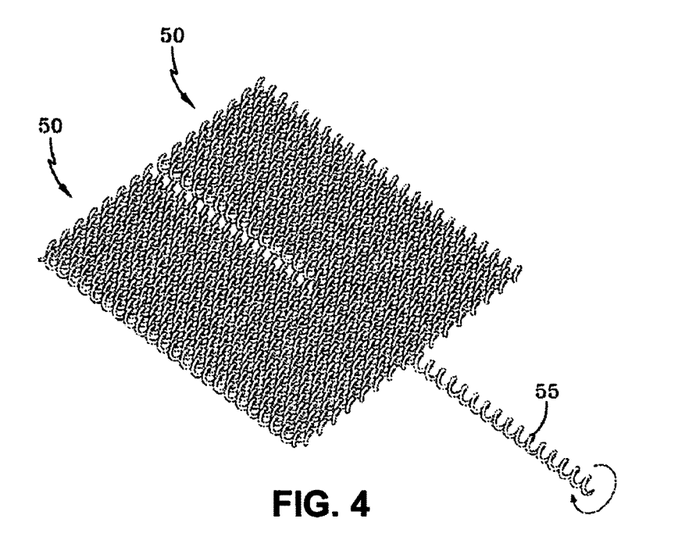
FIG. 4 represents a step in securing two sheets, such as the sheet of FIG. 1, together.
Figure 5:
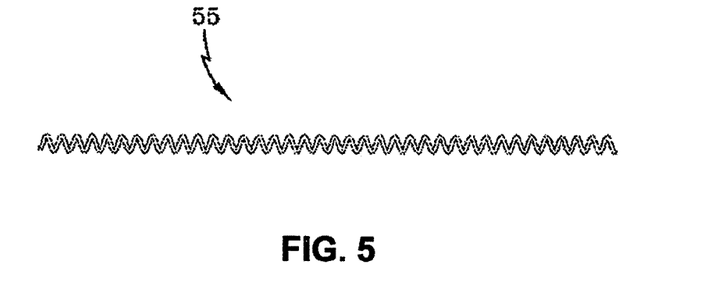
FIG. 5 represents a SMA spring for use with the present invention.
Figure 6:
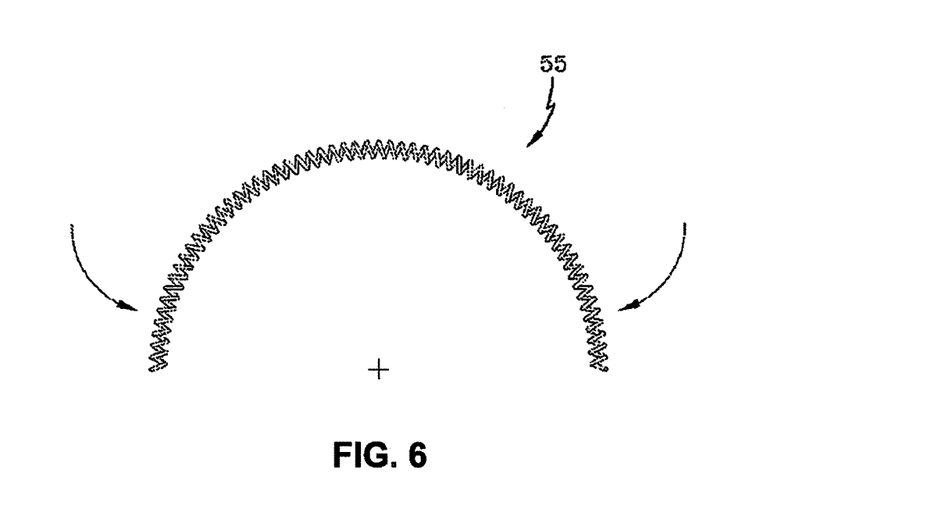
FIG. 6 represents the SMA spring of FIG. 5 in a deflected condition.

In one specific embodiment, a woven wire mesh has been used for a conventional lunar tire. However, as discussed above, greater strength and durability is desired. FIG. 1 shows a mesh sheet 50 of interlaced SMA springs 55 that may provide greater strength and durability than the wire mesh. FIGS. 2, 3, and 4 show intermediate steps in forming a mesh sheet 50 as shown in FIG. 1. In FIG. 2, a first SMA spring 55 is shown being rotated thereby interlacing that same first spring with a second SMA spring 55. In FIG. 3, a third SMA spring 55 is shown being rotated thereby interlacing that third spring with the already woven first and second springs 55. In FIG. 4, a SMA spring 55 is shown being rotated for connecting two mesh sheets 50 (i.e., the sheet of FIG. 2) of SMA springs 55. FIG. 5 shows a single SMA spring 55 for use as described above in FIGS. 1-4. FIG. 6 shows a single SMA spring 55 deflected for use in a tire, as described below.

Figure 7:
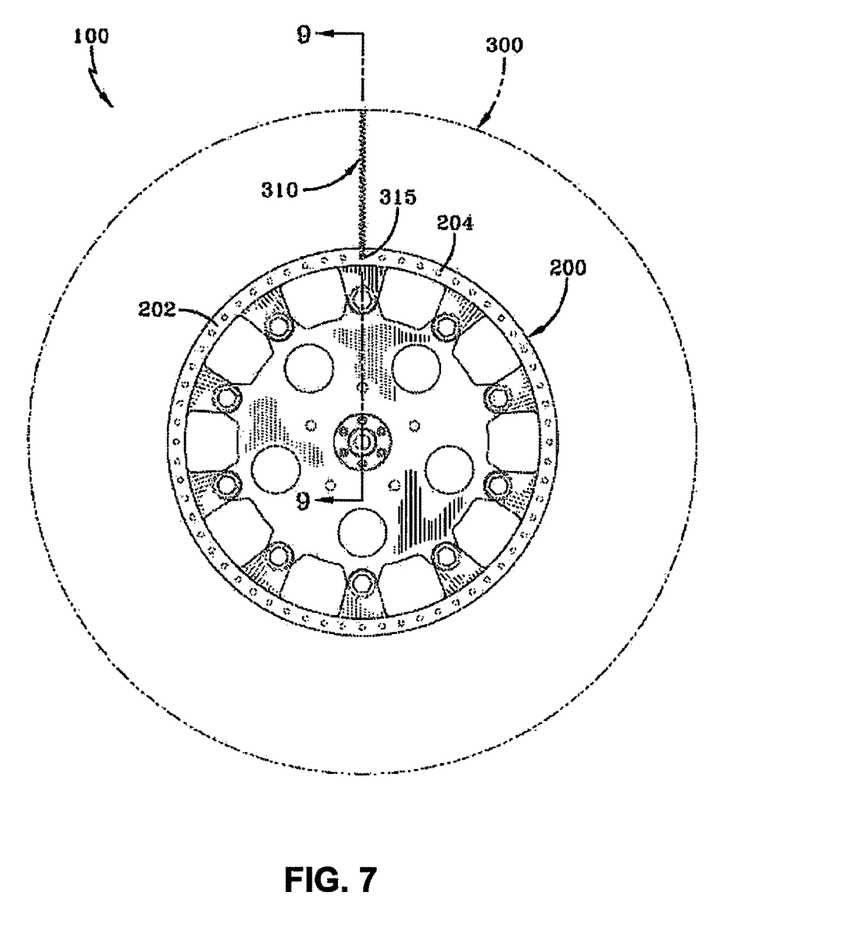
FIG. 7 represents a schematic illustration of a tire and wheel assembly in accordance with the present invention.
Figure 8:
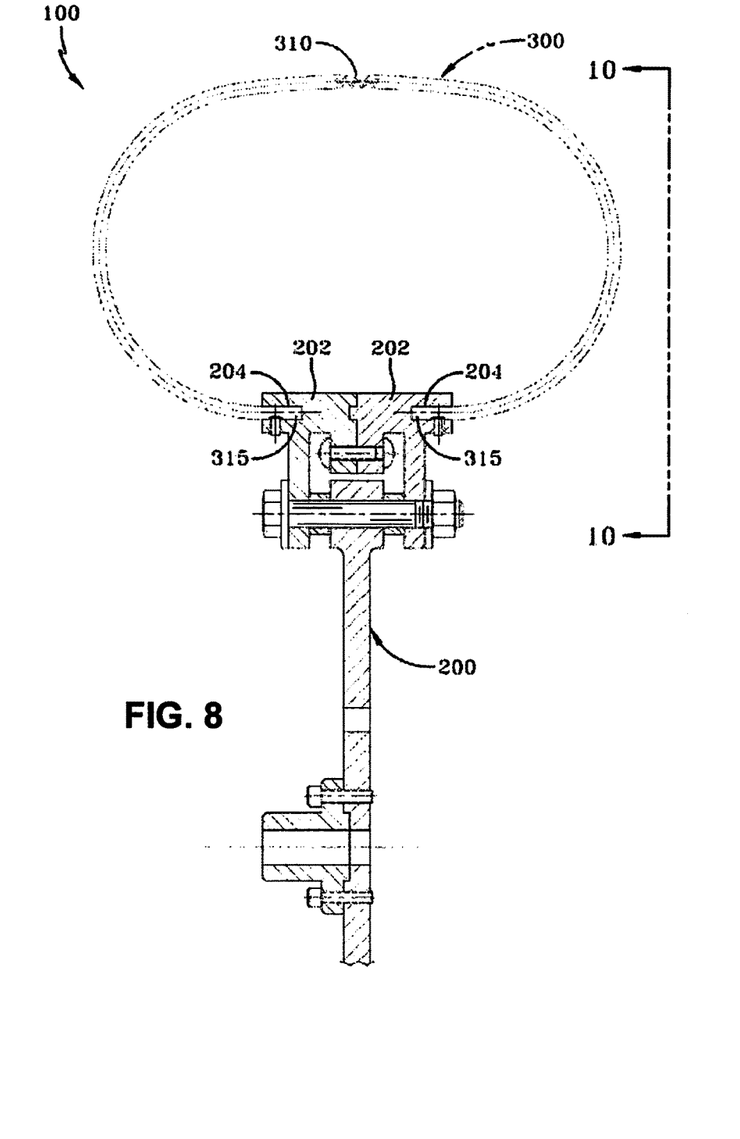
FIG. 8 represents a section taken through line 9-9 in FIG. 7.
Figure 9:
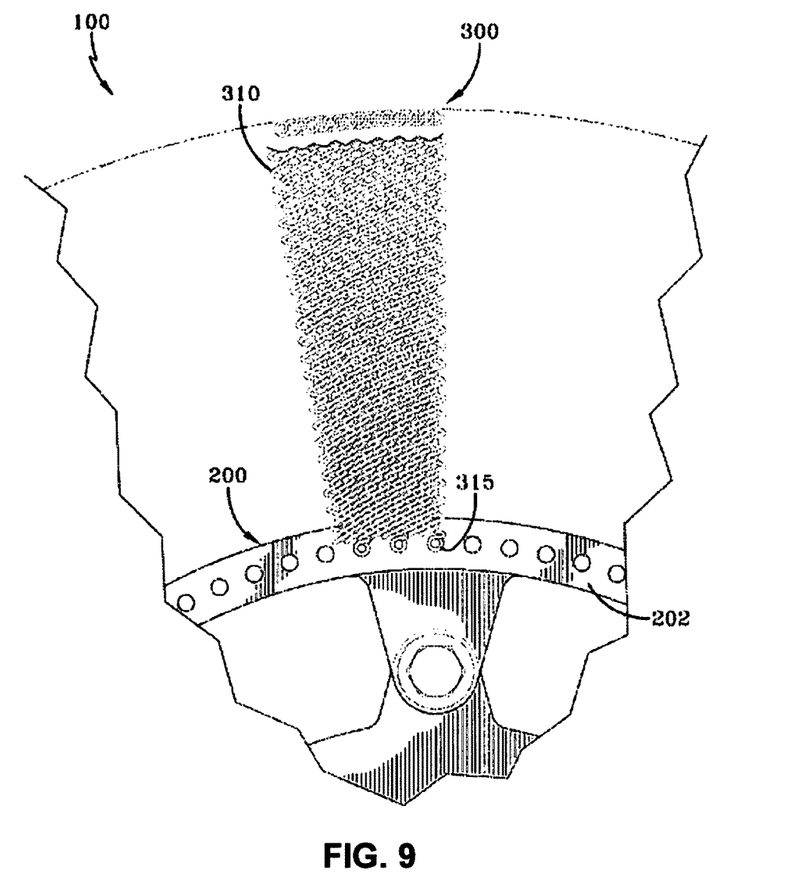
FIG. 9 represents a section taken through line 10-10 in FIG. 8.

As shown in FIGS. 7-9, an example assembly 100 in accordance with the present invention includes a wheel 200 and a tire 300. The wheel 200 has an annular rim 202 at each axial side for securing the tire 300 to the wheel. Each rim is fixed 202 relative to the other rim 202. Each rim 202 may include a plurality of socket holes 204 for aligning the tire 300 with the rim. Any other suitable means may be used for securing the tire 300 to the rim 200.

The tire 300 may include a plurality of SMA springs 310 extending radially away from the wheel 200 in an arching configuration and radially back toward the wheel. Each end 315 of each SMA spring 310 may be secured to wheel at a corresponding rim 202 of the wheel. Each SMA spring 310 has a middle portion interconnecting the ends 315. Each end 315 may be secured at an axial orientation (FIG. 8) or at an angled orientation, with the SMA spring 310 extending outward from one rim 202, then away from the wheel 300, then back over itself, then inward, and finally toward the other rim 202. Each end 315 of each SMA spring may thereby be oriented coaxially (or at an angle) with the other end 315 of the same SMA spring.

Further, each SMA spring 55 may be interlaced with adjacent SMA springs 55 (FIG. 1) enabling load sharing between SMA springs. As shown in FIG. 1, each SMA spring 55 is interlaced, or interwoven, with an adjacent SMA spring 55 on a first side of the SMA spring and further being interlaced with an adjacent SMA spring 55 on a second opposite side of the SMA spring. Thus, the SMA springs 310 extend radially and axially and form a laced toroidal structure extending about an entire circumference of the tire 300 (FIGS. 7-9).

The SMA springs 310 may be any suitable length, gauge, and pitch. The SMA springs 310 may vary in coil diameter (i.e., barrel springs may be used) or shape (i.e. elliptical coils may be used) to create continuity in the mesh or modify the tire's nominal contour. The SMA springs 310 may be further structured as two or more plies, one or more radially inner plies being radially overlapped by one or more radially outer plies.

In the foregoing description, certain terms have been used for brevity, clearness, and understanding; but no unnecessary limitations are to be implied therefrom beyond the requirement of the prior art, because such terms are used for descriptive purposes and are intended to be broadly construed. Moreover, the description and illustration of the present invention is by way of example, and the scope of the present invention is not limited to the exact details shown or described.

Having now described the features, discoveries, and principles of the present invention, the manner in which the present invention is constructed and used, the characteristics of the construction, and the advantageous, new, and useful results obtained, the scope of the new and useful structures, devices, elements, arrangements, parts, and combinations are hereby set forth.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A tire comprising:
a plurality of wires having a first end portion, a second end portion, and an arching middle portion;
each wire interlaced with at least one other wire thereby forming a laced toroidal structure extending about an entire circumference of the tire; and
a selected number of wires comprising a shape memory alloy (SMA) having an austenite crystal structure in an ambient condition, and during the application of an externally applied force upon the SMA, the austenite crystal structure of the SMA reorients to a martensitic crystal structure to minimize internal strain energy and decrease local stiffness to accommodate load and large deflection of the SMA.

2. The tire as set forth in claim 1, wherein the SMA is one of NiTi, Ag—Cd, Au—Cd, Cu—Al—Ni, Cu—Sn, Cu—Zn, Fe—Pt, Mn—Cu, Fe—Mn—Si, Co—Ni—Al, Co—Ni—Ga, Ni—Fe—Ga, Ti—Nb, β-Ti alloys, or ternary alloys or quaternary alloys of the SMA material.

3. The tire as set forth in claim 1, wherein the SMA comprises a composition of materials designed for superelasticity, shape memory effect (SME) behavior, or both.

4. The tire as set forth in claim 1, wherein the tire can withstand more than 1 percent strain before permanently deforming.

5. The tire as set forth in claim 1, wherein a subset of the wires are secured to a first annular rim of a wheel and a second annular rim of the wheel.

6. The tire as set forth in claim 1, further comprising a wheel with an annular rim at each axial side of the tire for securing the tire to the wheel.

7. The tire as set forth in claim 1, wherein the toroidal structure defines a first ply for the tire.

8. The tire as set forth in claim 7, further comprising a second ply, the second ply radially overlapping the first ply.

9. The tire as set forth in claim 8, wherein the second ply comprises a laced toroidal structure having a plurality of SMA wires.

10. The tire as set forth in claim 9, wherein each SMA wire of the second ply comprises:
   a first end portion, a second end portion, and an arching middle portion, each SMA wire being interlaced with at least one other SMA wire thereby forming a laced toroidal structure extending about an entire circumference of the tire.

11. A tire comprising:
   a plurality of wires having a first end portion, a second end portion, and an arching middle portion interconnecting the first end portion and the second end portion;
   each wire extending radially outward from the first end portion to the middle portion and radially inward from the middle portion to the second end portion;
   a plurality of wires interlaced with an adjacent wire on a first side of the wire and further being interlaced with an adjacent SMA spring on a second opposite side of the SMA spring thereby forming a toroidal structure extending about an entire circumference of the tire; and
   a selected number of wires comprising a shape memory alloy (SMA) having an austenite crystal structure in an ambient condition, and during the application of an externally applied force upon the SMA, the austenite crystal structure of the SMA reorients to a martensitic crystal structure to minimize internal strain energy and decrease local stiffness to accommodate load and large deflection of the SMA.

12. The tire as set forth in claim 11, wherein the SMA is one of NiTi, Ag—Cd, Au—Cd, Cu—Al—Ni, Cu—Sn, Cu—Zn, Fe—Pt, Mn—Cu, Fe—Mn—Si, Co—Ni—Al, Co—Ni—Ga, Ni—Fe—Ga, Ti—Nb, or β-Ti alloys, or ternary or quaternary alloys of the materials.

13. The tire as set forth in claim 11, wherein the SMA comprises a composition of materials for pseudoelasticity, superelasticity, or shape memory effect (SME).

14. The tire as set forth in claim 11, wherein the first end portion of each SMA wire is secured to a first annular rim of a wheel and the second end portion of each SMA wire is secured to a second annular rim of the wheel.

15. The tire as set forth in claim 11, wherein each SMA wire forms an arch extending radially outward from a wheel.

16. The tire as set forth in claim 11, further comprising a wheel with an annular rim at each axial side of the tire for securing the SMA wires to the wheel.

17. The tire as set forth in claim 11, wherein the toroidal structure defines a first ply for the tire.

18. The tire as set forth in claim 17, further comprising a second ply, the second ply radially overlapping the first ply.

19. The tire as set forth in claim 18, wherein the second ply comprises a toroidal structure having a plurality of SMA wires.

20. The tire as set forth in claim 19, wherein each SMA wire of the second ply comprises:
   a first end portion, a second end portion, and an arching middle portion interconnecting the first end portion and the second end portion, each SMA wire of the second ply extending radially outward from the first end portion to the middle portion and radially inward from the middle portion to the second end portion,
   a plurality of SMA wires of the second ply being interlaced with an adjacent SMA wire on a first side of the SMA wire and further being interlaced with an adjacent SMA wire on a second opposite side of the SMA wire thereby forming a toroidal structure extending about an entire circumference of the tire.

* * * * *